United States Patent [19]

Kistner

[11] 3,847,722
[45] Nov. 12, 1974

[54] IMPREGNATED MATERIALS FOR LEAK PREVENTION

[75] Inventor: John F. Kistner, Stillwater, Minn.

[73] Assignee: Minnesota Mining and Manufacturing Company, St. Paul, Minn.

[22] Filed: Jan. 27, 1972

[21] Appl. No.: 221,295

[52] U.S. Cl................ 161/109, 61/36 R, 138/97, 156/94, 156/293, 161/43, 161/119, 161/158, 161/159, 161/161, 161/162, 161/168, 161/190, 161/206, 161/209, 166/295, 206/84, 260/29.2 TN, 260/77.5 A, 264/36, 264/236, 404/64
[51] Int. Cl...... B32b 3/10, B32b 27/40, E02d 37/00
[58] Field of Search.................. 206/84; 138/97, 98; 161/43, 83, 161, 190, 109, 119, 158, 159, 162, 168, 206, 209; 260/77.5 A, 29.2 TN; 156/94, 293; 166/285, 295; 404/64; 61/36 R; 264/36; 52/743

[56] References Cited
UNITED STATES PATENTS

| | | |
|---|---|---|
| 2,867,278 | 1/1959 | Mallory et al............. 260/29.2 TN |
| 2,948,691 | 8/1960 | Windemuth et al........... 117/155 R |
| 3,193,438 | 7/1965 | Schafer............................... 161/190 |
| 3,284,273 | 11/1966 | Prentice............................... 161/83 |
| 3,536,564 | 10/1970 | Duffy................................. 161/190 |
| 3,546,846 | 12/1970 | Sens...................................... 161/43 |
| 3,694,301 | 9/1972 | Gruenewald et al................ 161/190 |

FOREIGN PATENTS OR APPLICATIONS 1,013,376   12/1965   Great Britain........................ 106/90

OTHER PUBLICATIONS

Damusis, Sealants, Reinhold, 1967 pp. 155-& 157.

Primary Examiner—George F. Lesmes
Assistant Examiner—Charles E. Lipsey
Attorney, Agent, or Firm—Alexander, Sell, Steldt & DeLaHunt

[57] ABSTRACT

A permeable, deformable substrate impregnated with an isocyanat-terminated, hydrophilic urethane prepolymer is used to stop water leaks in small holes or crevices by positioning the impregnated material therein, the prepolymer reacting with water to form a swollen, adherent, waterinsoluble hydrogel.

3 Claims, 4 Drawing Figures

PATENTED NOV 12 1974    3,847,722

IMPREGNATED MATERIALS FOR LEAK PREVENTION

This invention relates to a sealing material useful in sealing rigid structures, such as concrete, to minimize or prevent water leakage through voids, cracks, or other openings therein. In another aspect, it relates to a method for sealing such rigid structures with said sealing material. In yet another aspect it relates to the structure so sealed.

There are numerous man-made, water-bearing or water-holding structures disposed above or below ground level such as man-holes, sewer lines, water pipes, wells, settling ponds, and basements, made of various rigid structural materials such as concrete, cast iron, plastic, or the like which, because of the nature of the construction material or the manner of constructing such structures or their locations, inherently have or will develop in time, various discontinuities, such as openings, cracks, fissures, joints, holes or the like, which provide a pathway for the undesirable ingress or egress of water to or from such structures.

Numerous sealing compositions and sealing techniques have been proposed or used to prevent the ingress or egress of water into or from such structures. For example, urethane-cement mixtures where oakum is impregnated with a urethane prepolymer and reacted with a catalyst in a dry void are known sealing compositions (U.S. Pat. No. 2,902,388, issued Sept. 1, 1959, to Szukiewicz).

While many known sealing compositions are satisfactory, their placement often requires a clean or dry environment or surface. Some sealing materials, such as mortar, shrink upon setting and curing to create cracks or small fissures or the resulting sealants themselves may develop cracks. Other sealing materials must be used in a dry, powdered form and consequently lack mobility and cannot be extensively dispersed or placed in a large leakage or drainage void. Other sealants applied in the form of a liquid or slurry cannot be extensively dispersed or placed in the presence of a strong flow of water; when such flow is present in conjunction with large voids, the liquid or slurry is carried away from the area desired to be sealed. Urethane polymers resulting from the reaction of water-insoluble isocyanate prepolymers (based on water-insoluble polyoxypropylene triols) with the moisture in the air have been disclosed, but these materials are unsatisfactory for sealing wet substrates during water flow. Some sealing compounds require catalysts, heat, or pressure, or contain water-immiscible hydrocarbon solvents, and thus, their application is costly and limited as well as requiring extensive surface preparation. When a sealing composition contains a water-immiscible solvent, said sealing composition will not work effectively on wet substrates. Most water-bearing structures are difficult to dry effectively, and consequently, the prior art sealing compositions required substantial time and expense to insure proper sealing or, when proper care was not exercised, an inefficient seal was formed. Still other sealants are multi-component systems which require careful metering and mixing or have a very limited pot life. The application equipment for many of the prior art sealing mixtures and techniques is cumbersome and costly and many of the sealing techniques are limited only to those areas which are readily accessible for extensive surface preparation and where the sealing composition has an extended period in which to cure.

Briefly, the subject invention comprises sealing, patching, or coating in the presence of water, a crack, fissure, or other void which normally allows the flow of water through a structure, by placing in said void a sealing composition comprising a permeable, deformable body, e.g., consolidated fibrous material, which has been impregnated with a hydrophilic water-reactive, isocyanate-terminated prepolymer solution, which, in the presence of water, polymerizes or cross links to form an adherent, solid, hydrophilic water-insoluble elastomeric poly(urethane-urea), thereby minimizing or preventing the flow of water through said void. The placement of the sealing composition in the void can be accomplished underwater (even under a significant hydrostatic head) or during the leakage of water into or from the structure through said void due to the water-miscible characteristics of the isocyanate-terminated prepolymer of this invention. The flow of water through said void during the sealing operation will be advantageous in many instances as it serves to promote curing of the prepolymer impregnated in the material to form the water-insoluble poly(urethane-urea) in a very short time.

Several embodiments of the invention are illustrated in the accompanying drawing in which.

Figure 1:
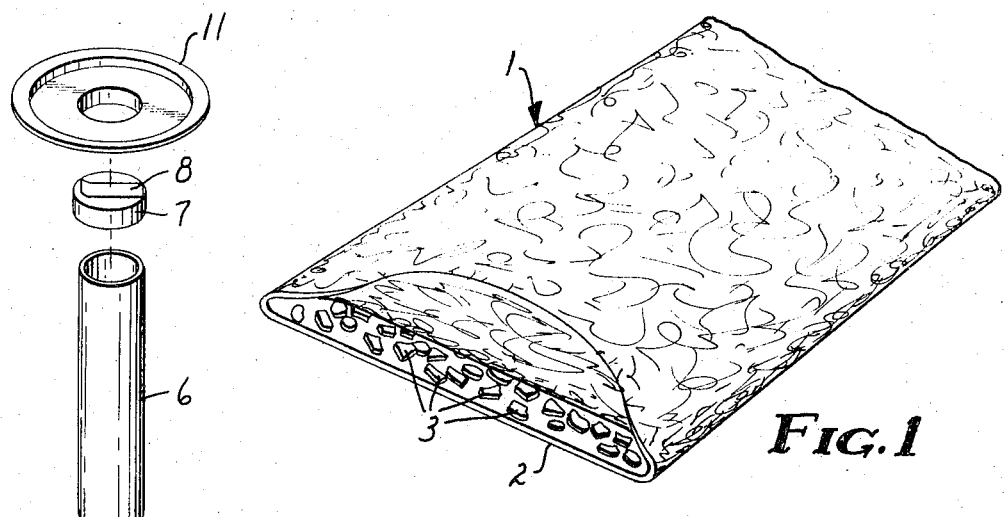
FIG. 1 is a perspective view in partial section of one embodiment of the sealing material of this invention wherein one type of impregnated permeable substrate of consolidated fibrous material is enclosed in a sealed random web of polymeric material.
Figure 2:
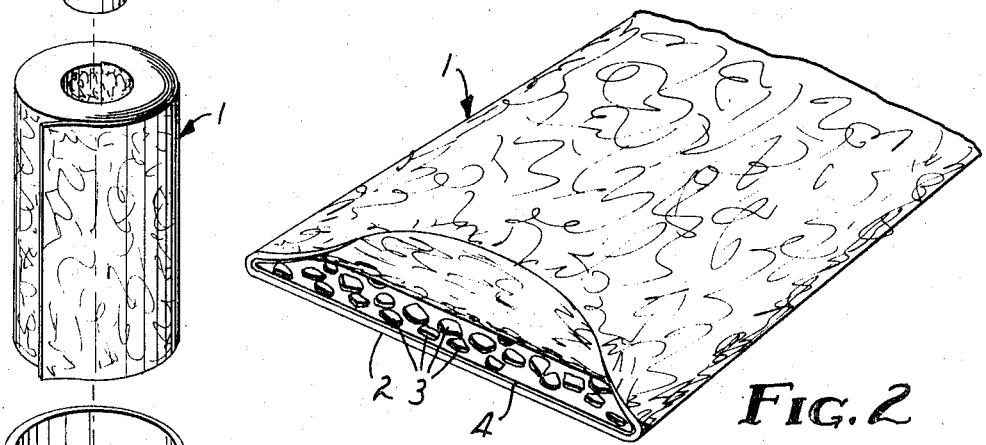
FIG. 2 is a perspective view in partial section of another embodiment of the sealing material of this invention where the impregnated permeable substrate is further enclosed in a water-impermeable envelope.

Referring now to the accompanying drawing (where like reference numbers have been used to designate like parts) and initially to FIGS. 1 and 2, reference number 1 designates generally a deformable laminated structure, comprising a heat-sealed random web 2, enclosing particulate permeable fibrous bodies 3, which have been or will be impregnated with a hydrophilic, water reactive, isocyanate-terminated prepolymer. A water-impermeable envelope 4 can be used to enclose the impregnated bodies 3 to protect the impregnated bodies from moisture and the premature curing of said prepolymer.

Figure 3:
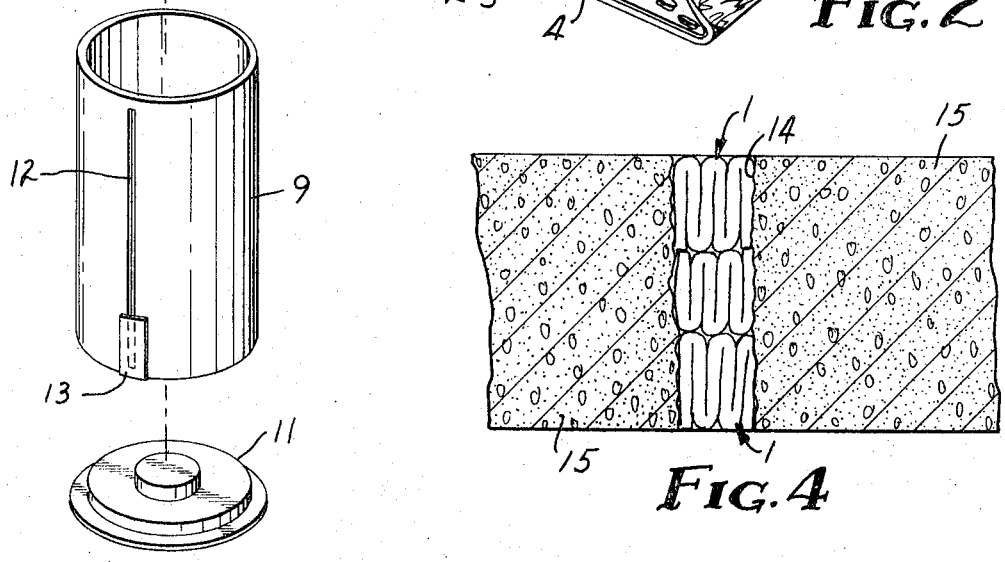
FIG. 3 is an exploded view of a container adapted for the storage of the sealing material of FIG. 1 and a separate container for the prepolymer used to impregnate said structure.

FIG. 3 shows a container adapted to hold a laminated structure similar to FIG. 1, wherein the laminated structure of FIG. 1 is rolled about a moisture-proof container 6, being capped with a cap 7, having a tear strip opening 8, said container containing the isocyanate-terminated prepolymer used to saturate the laminate 1. The laminate and prepolymer container are enclosed in casing 9 which is capped on each end with caps 11 and having a slit 12 sealed with tape 13 as disclosed in U.S. Pat. No. 3,532,210. When it is necessary to seal a void, the container 6 is opened and the isocyanate-terminated prepolymer is poured over the laminated structure 1 which is still rolled in the moisture-proof container. The container of FIG. 3 is then recapped and the laminated web, now impregnated with the isocyanate-terminated prepolymer, can be withdrawn through the slit 12 and cut to convenient size lengths prior to being placed in the void which is to be sealed.

Figure 4:
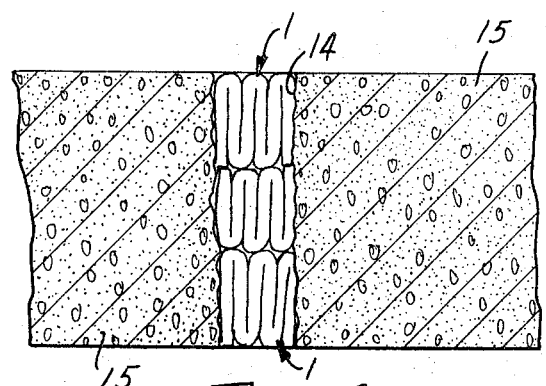
FIG. 4 is a view in section of a structure sealed using the embodiment of FIGS. 1 or 2.

FIG. 4 shows a concrete structure 15 containing a fissure or crack 14 which has been sealed using the invention of FIGS. 1 or 2 by folding, wedging, or otherwise forcing one or more saturated laminates into the fissure where the prepolymer reacts with the water present, and swells, adhering to the concrete and forming a tough, water-impermeable barrier.

Broadly, any permeable body or substrate may be used as the filler, carrier, and structural reinforcement in the practice of this invention, although the body need not fulfill all the possible functions. Wood products such as wood pieces or chips, and strips of soft wood (e.g., balsa) represent a readily available source of permeable substrates which can be used in combination with laminating materials such as nonwoven webs. Wood chips or strips could also be used along without a laminating web, since the wood substrate can be packed to give a relatively coherent structure which will remain in a locus of water incursion until the isocyanate-terminated prepolymer has cured and forms a water-impermeable barrier.

Many types of permeable, non-fibrous substrates can be impregnated with the prepolymer in the practice of this invention. Polymeric foams, e.g., polyurethane or polystyrene, are highly permeable to the isocyanate-terminated prepolymer used in this invention. Polymer foams and sponges have several distinct advantages due to the large variation in properties available from very soft, highly permeable foams, to relatively rigid foams of low permeability. A type of foam can be chosen which best meets the requirements necessary to easily and effectively seal a particular locus of water incursion.

A particularly useful permeable, deformable material which can be impregnated will be a body of consolidated fibrous material, examples of which are burlap, expanded cork, nonwoven random webs, other forms of webs, ordinary woven cloth, scrims, rope, twine, leather, paper, and nut shells. A preferred material is one having adequate deformability so that a workman can wedge the impregnated material into cracks, holes, fissures or other voids sought to be sealed with the tip of any convenient tool. The impregnated body preferably should not rip while being packed, even with a relatively sharp tool such as a screwdriver, and yet the impregnated body should pack easily.

Metal fibrous substrates such as lead or steel wool can be used because of their inherent ability to deform when subject to mechanical force during wedging. A preferred embodiment uses expanded vermiculite, such as that used as a packing medium. Vermiculite can be easily deformed or flattened and is an extremely permeable substrate which can be impregnated with the isocyanate-terminated prepolymer. When the impregnated expanded vermiculite is packaged in a nonwoven web of nylon, polypropylene, or other polymeric webs, the impregnated vermiculite is held in place as the isocyanate-terminated prepolymer reacts with the water, thereby bonding the vermiculite, the web and the walls of the water-bearing structure, forming a water-impermeable seal at the void. Vermiculite has the additional desirable property that when compacted at the void of water incursion, the expanded vermiculite will tend to compress and release the impregnated isocyanate-terminated prepolymer, promoting a rapid cure of the prepolymer with water to form poly(urethane-urea).

The sealing structure of this invention uses an isocyanate-terminated prepolymer having polyoxyalkylene chains comprising a plurality of oxyethylene units. This particular chain is uniquely water-miscible, water-soluble, and hydrophilic. Other water-reactive, isocyanate-terminated prepolymers not containing oxyethylene linkages are water immiscible; this limits or prevents their successful use as sealing agents in water-bearing environments. The poly(urethane-urea) products formed by this invention are not subject to deterioration by oxidation or rust and resist environmental action such as biological degradation.

The preparation of the isocyanate-terminated prepolymer used in the sealing composition of this invention and the reaction thereof with water to form a polyurea is disclosed in the art, see U.S. Pat. Nos. 2,726,219 and 2,948,691 (see particularly Example 8) and Polyurethanes: Chemistry and Technology, by Saunders & Frisch, Part I, Interscience Pub., New York, (1962).

Generally, such a prepolymer is prepared by reacting an aliphatic or aromatic polyisocyanate with a polyoxyethylene polyol, using NCO/OH equivalent ratio of at least 2/1, and preferably slightly higher than this, e.g., 2.1/1 to 2.5/1.

Broadly, the preferred class of isocyanate-terminated prepolymers used in this invention are those which are water-miscible and can be expressed in terms of the formula $$Y_1[(RO)_0-Y_2-(NCO)_p]_z$$

<div style="text-align:right">I</div>

In formula I, $Y_1$ is an active hydrogen-free residue of a compound having a plurality of active hydrogen atoms and preferably a polyhydroxyalkane, such as ethylene glycol, glycerol, or 1,1,1-trimethylolpropane. $(RO)_0$ is a hydrophilic polyoxyalklene chain having a plurality of oxyethylene units, such as (1) a polyoxyethylene chain (the preferred type of chain), (2) a chain having alternating blocks or backbone segments of oxyethylene units and blocks or backbone segments of oxypropylene units, or (3) a chain of randomly distributed (i.e., a heteric mixture) of oxyethylene and oxypropylene units. The subscript 0 is the number of oxyalkylene units in said polyoxyalkylene chain, this number being sufficient to impart water-miscibility to the prepolymers. $Y_2$ is a linkage or bridge, the function of which is to bond said polyoxyalkylene chain to the isocyanate moieties shown in the formula; $p$ is the number of said isocyanate moieties and, generally, will be 1 to 5, preferably 1 to 3; and $z$ is a number equal to the functionality or number of said plurality of active hydrogen atoms in said compound (e.g., said polyhydroxyalkane or polyaminoalkane) which provides said residue $Y_1$, and generally $z$ will be 2 to 6. Where said prepolymer is prepared by reacting a polyol and a polyisocyanate, the polyoxyalkylene chain will be terminated with —OC(O)NH—R'(NCO)$_p$, where —OC(O)NH— is a carbamate (or urethane) group resulting from the reaction of a hydroxyl group from said polyol precursor with an isocyanate moiety from said polyisocyanate precursor. R' is the residue or nucleus of polyisocyanate precursor and p is an integer equal to q-1, where q is the number of isocyanate moieties of said polyisocyanate precursor. The terminating isocyanate groups can react with water, resulting in the formation of an insoluble poly-(urethane-urea) water-impermeable hydrogel.

The term "active hydrogen atom" as used herein refers to a hydrogen atom which reacts with the isocyanate moiety under urethane or urea bond-forming conditions, (determined by the Zerewitinoff procedure, J. Am. Chem. Soc., 49, 3181 (1927) such as that disclosed in U.S. Pat. No. 3,330,782). The term "water-miscible" in this context means that the prepolymer is dispersible or soluble in water.

Preferred water-miscible prepolymers within the scope of this invention are those of the formula

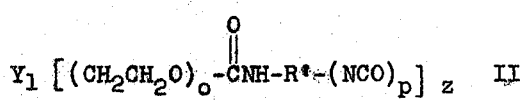
II where $Y_1$ is the active hydrogen-free residue of a low molecular weight polyhydroxyalkane such as ethylene glycol, and R' is tolylene. The subscript 0 is the number of oxyethylene units as shown necessary to make the prepolymer water miscible. To insure water miscibility, the oxyethylene backbone must contain at least 15 units, therefore, 0 must be equal to at least 15. An upper limit on 0 is fifty units; when 0 is greater than 50, the prepolymers are solids and unless greatly diluted with solvents, the resulting solutions have viscosities too high for easy penetration into the porous substrates. The preferred prepolymer has an 0 approximately equal to 23. The subscript p is 1 to 3, and z is equal to the functionality, e.g., 2 or 3, of said compound from which $Y_1$ is derived.

Another subclass of water-miscible prepolymers useful in this invention can be expressed by the formula

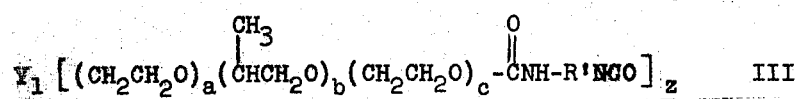
III where $Y_1$, R' and z are as defined above in formula II and a, b, c are integers such that the ratio of $(a + c)/b$ is greater than 1 and thus the prepolymers are water-miscible. Commercially available polyol precursors useful in making the above-described water-miscible isocyanate-terminated prepolymers used in this invention are the hydrophilic poly(oxyethylene-oxypropylene) polyols sold under the trademark "Pluronic," such as Pluronic-L35, L38, and P46, and hydrophilic polyols with heteric oxyethylene-oxypropylene chains, sold as "polyol functional fluids" such as WL-580, WL-600 and WL-1400. Generally, the hydrophilic or water-soluble oxyethylene-containing polyols to be used will have molecular weights of at least 400 and as high as 2,000; preferably they will have molecular weights of 600 to 1,540. A preferred polyol (particularly when reacted with tolylene diisocyanate to form the prepolymer) is "Carbowax 1,000" which is a polyethylene glycol having a molecular weight of about 1,000. The prepolymers of formulas I, II, and III will be useful in many applications of this invention, when cured in situ to form poly(urethane-urea) polymers. In many cases, the cured poly(urethane-urea) polymer is highly water-swellable when in contact with water due to the polymer's high degree of hydrophilicity (e.g., where the polyoxyalkylene backbone consists of oxyethylene units only). As a consequence, contact with water causes expansion of the hydrophilic polymer resulting in a tighter seal of the cavity.

Polyisocyanates which can be used to prepare the isocyanate-terminated prepolymers used in this invention and described above include conventional aliphatic and aromatic polyisocyanates. The preferred polyisocyanates to be used will be aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-diisocyanate, and 20 weight percent of tolylene-2,6-diisocyanate. A 65:35 blend of the 2,4- and 2,6-isomers is also useful. These polyisocyanates are commercially available under the trademarks "Hylene TM, Nacconate 80, and Mondur TD-80." Other useful polyisocyanate compounds which can be used are other isomers of tolylene diisocyanate, hexamethylene-1,6-diisocyanate, diphenylmethane-4,4'-diisocyanate, m- or p-phenylene diisocyanate and 1,5-naphthalene diisocyanate. Polymeric polyisocyanates can also be used, such as polymethylene polyphenyl polyisocyanates, such as those sold under trademarks "Mondur MRS" and "PAPI." A list of useful commercially available polyisocyanates is found in Encyclopedia of Chemical Technology, Kirk and Othmer, 2nd Edition, Volume 12, pp. 46–47, Interscience Pub. (1967).

The lower molecular weight prepolymers per se used in this invention are generally viscous liquids and though they could be used by themselves as impregnating agents, it is preferable to employ the same as well as the higher molecular weight solid prepolymers in the form of a solution with a suitable solvent which is nonreactive with the isocyanate moiety, in order to achieve the desired penetration of the permeable structure. Thus, organic solvents or any other organic compounds which contain active hydrogen atoms, are to be avoided in making and using the prepolymer agents of this invention.

Preferably, these solvents are water-miscible polar organic solvents. Alternately, but not preferably, the solvent can be a water-immiscible organic solvent where the conditions will allow adequate penetration of the resulting solution. Representative solvents which can be used include acetone, tetrahydrofuran, methylethylketone, methylene chloride, toluene, and methoxyethylacetate, N,N-dimethyl-acetamide, and 1,2-dimethoxyethane. After the impregnated substrate is placed at the locus of water incursion, the solvent will either dissipate into the environmental water or will evaporate into the ambient atmosphere.

The concentration of the prepolymer in the solvent can vary, depending upon such factors as the viscosity desired, the technique of treating the permeable substrate, and the amount of prepolymer desired in the permeable substrate. Generally, concentrations of 25 to 95 weight by volume (w/v) percent of prepolymer will be suitable, with the preferred concentrations being 60 to 95 (w/v) percent of prepolymer. The higher concentration solution can be used in the very open substrates such as burlap or nylon scrim while the more dilute solutions can be used with balsa wood or cork. Generally, the impregnated substrate will contain 5 to 90 percent preferably 40 percent to 80 percent by weight of prepolymer based on the weight of the impregnated substrate omitting solvent.

Upon application of the prepolymer impregnated substrate in the locus of water incursion to be treated, the prepolymer reacts with the water present in the locus or water added to the laminate. The reaction mechanism of this reaction is well known; it results in the formation of urea-linkages, the water acting as a chain extender, and the evolution of carbon dioxide which tends to foam the reaction mixture and form a cellular polymer. The degree of foaming depends upon the environmental confines of the permeable substrate, the amount of solvent in the treating solution, and the amount of water in the fissure or void treated. By carrying out the treatment at ambient pressure, the removal of carbon dioxide is facilitated, thus minimizing the cellular structure of the resulting polyurethane-polyurea polymer. Due to the hydrophilic nature of the prepolymer, the prepolymer wets the walls of the void, thereby ensuring a high degree of contact with the walls of void in the structure, and adhesively bonds the hydrophilic polymer to the walls of the aforementioned void. The resulting polymer is water insoluble, tough, strong and can be flexible or rigid depending on the molecular weight of the prepolymer and the "carrier" substrate chosen.

The isocyanate-terminated prepolymers used in this invention will dissolve in the water which is flowing through the void in which has been placed the impregnated body and react with extreme rapidity, e.g., 3–5 minutes total curing time, resulting in a very fast seal, whereas similar prepolymers based on oxypropylene would take from 12–24 hours to cure and, in the presence of flowing water, would be impractical for sealing sites of water incursion.

Another characteristic of the prepolymers used in this invention are their adhesive qualities when placed in contact with porous, water-permeable substrates. The water-miscibility of the prepolymer allows the prepolymer of this invention to intimately contact the surface to be sealed and will allow a strong intimate bond since the water-miscibility of the polymer allows it to react on the surface of the structure being sealed, even though the surface being sealed contains large amounts of water. This reaction of the surface allows better contact adhesion of the poly(urethane-urea) to the surface being sealed and results in a much tighter seal. The prepolymer also dissolves into water residing in micropores and fissures at the surface of the water incursion, said prepolymer polymerizing in situ providing excellent mechanical bonding.

Numerous structures can be sealed using the impregnated substrates of this invention. Among the construction materials which can be sealed using this invention are: siliceous materials such as concrete, water pipes, wells, sewer lines, manholes, cast iron pipes, plastic pipes and water lines. The impregnated substrates can also be used to caulk wooden structures, e.g., barrels and boats.

Objects and advantages of this invention are illustrated in the following examples; but the various materials and amounts thereof described in these examples and various other conditions and details recited therein, should not be construed to unduly limit the scope of this invention. All parts in the examples are given by weight unless otherwise specified.

EXAMPLE 1

1,000 parts polyoxyethylene diol ("Carbowax" 1,000 having a molecular weight of about 1,000) was stirred and reacted with 351 parts of tolylene diisocyanate (80/20 mixture of the 2,4- and 2,6-isomers) under substantially anhydrous conditions for about two hours and the reaction mixture allowed to stand for several days. The resulting isocyanate-terminated prepolymer was a viscous liquid at 25° C. and an 80 percent solids (w/v) anhydrous acetone solution of the prepolymer had a viscosity of approximately 350 centipoise at about 22° C. The resulting prepolymer had a structure like said formula II where $Y_1$ is the residue of ethylene glycol, $R'$ is tolylene, 0 is about 21, $p$ is 1 and $z$ is 2.

EXAMPLE 2

Cheesecloth was dipped into a 60 percent (w/v) anhydrous acetone solution of the hydrophilic prepolymer of Example 1. Excess solution was drained from the cheesecloth and the impregnated cheesecloth then wedged into a void at the joint of a rain spout where a 90° adapter was positioned in the drain spout. After a heavy rain, the joint of the rain spout was water-impermeable due to the formation of a tough, rubbery, poly(urethane-urea) which acted as a gasket to fill the void from which water had previously been able to leak in copious amounts.

EXAMPLE 3

A random web was constructed using a "Rando-Webber" machine, said web consisting of 63 percent polypropylene staple ("Herculon," 1½ inch in length, 1.8 denier), and 37 percent viscose staple ("Vinyon," 1½ inch in length, 1.5 denier). Dry expanded vermiculite pieces of approximately ¼ inch size were sandwiched between two layers of the random web, such that 70 percent of the total unimpregnated weight of the construction consisted of dry vermiculite. The construction, before impregnation with the prepolymer solution, was heatshrunk at 225° F. for twenty seconds and the edges of the resulting construction were heat sealed with a hot roller to form a continuous envelope of random web around the dry sieved expanded vermiculite.

The resulting laminated structure, similar to that of FIG. 1, was saturated with a 40 percent (w/v) anhydrous acetone solution of the prepolymer of Example 1. The impregnated web was laid flat in an aluminum tray and a beaker of water quickly inverted and pushed down on top of the impregnated permeable laminate. The rim of the inverted beaker caused a depression in the impregnated laminate, forming a tight gasket-like seal around the edge of the beaker. The water did not flow from the beaker, and after 10 minutes, the beaker was separated from the impregnated laminate with considerable force because the poly(urethane-urea) formed from the prepolymer of this invention adhered tightly to the rim of the beaker. A tough, rubbery gasket in the shape of a beaker rim remained in the laminate, the construction of the laminate having conformed to the shape of the beaker. The absorbed prepolymer solution had reacted with the water in the beaker to form a tough, adherent rubbery gasket.

Various modifications and alterations of this invention will become apparent to those skilled in the art without departing from the scope or spirit of this inven-

What is claimed is:

1. A deformable, permeable substrate comprising expanded vermiculite enclosed in a non-woven web envelope, said vermiculite being impregnated with a hydrophilic prepolymer, said prepolymer being a water-miscible isocyanate-terminated prepolymer having a plurality of oxyethylene units and the formula:

$$Y_1-[(CH_2CH_2O)_0-CONH-R-(NCO)_p]_z$$

where $Y_1$ is an active hydrogen-free residue of a polyhydroxyalkane, $(CH_2CH_2O)_0$ is a hydrophilic polyoxyethylene chain, 0 is the number of oxyethylene units in said chain, 0 being from about 15 to 50, R is an aromatic nucleus, $p$ is an integer equal to $q$-1, where $q$ is the number of isocyanate moieties of a polyisocyanate precursor, and $z$ is a number equal to the hydroxyl functionality of said polyhydroxyalkane.

2. The substrate according to claim 1 where the impregnated vermiculite enclosed in the non-woven web envelope is enclosed in a rupturable water-impermeable envelope.

3. A structure normally having discontinuities therein susceptible to leakage, said discontinuities being sealed by an impregnated permeable deformable substrate comprising expanded vermiculite enclosed in a non-woven web envelope, said vermiculite containing a hydrophilic polyurethane prepolymer which is cured and polymerized in situ in the presence of water to form a hydrophilic, water-insoluble poly(urethane-urea) forming a water impermeable barrier in said discontinuities, said prepolymer having the formula:

$$Y_1-[(CH_2CH_2O)_0-CONH-R-(NCO)_p]_z$$

where $Y_1$ is an active hydrogen-free residue of a polyhydroxyalkane, $(CH_2CH_2O)_0$ is a hydrophilic polyoxyethylene chain, 0 is the number of oxyethylene units in said chain, 0 being from about 15 to 50, R is an aromatic nucleus, $p$ is an integer equal to $q$-1, where $q$ is the number of isocyanate moieties of a polyisocyanate precursor, and $z$ is a number equal to the hydroxyl functionality of said polyhydroxyalkane.

* * * * *